(12) United States Patent
Pasca

(10) Patent No.: US 11,209,646 B2
(45) Date of Patent: Dec. 28, 2021

(54) HEAD-UP DISPLAY AND METHOD FOR DRIVING A HEAD-UP DISPLAY

(71) Applicant: Continental Automotive GmbH, Hannover (DE)

(72) Inventor: Andrei Pasca, Timisoara (RO)

(73) Assignee: Continental Automotive GmbH, Munich (DE)

( * ) Notice: Subject to any disclaimer, the term of this patent is extended or adjusted under 35 U.S.C. 154(b) by 91 days.

(21) Appl. No.: 16/642,490

(22) PCT Filed: Aug. 21, 2018

(86) PCT No.: PCT/EP2018/072478
§ 371 (c)(1),
(2) Date: Feb. 27, 2020

(87) PCT Pub. No.: WO2019/042812
PCT Pub. Date: Mar. 7, 2019

(65) Prior Publication Data
US 2020/0257115 A1    Aug. 13, 2020

(30) Foreign Application Priority Data

Aug. 28, 2017 (EP) ..................... 17465543

(51) Int. Cl.
*G02B 27/01* (2006.01)
*B60K 35/00* (2006.01)
(52) U.S. Cl.
CPC .......... *G02B 27/0101* (2013.01); *B60K 35/00* (2013.01); *B60K 2370/1529* (2019.05);
(Continued)

(58) Field of Classification Search
CPC .... H04N 9/315; H04N 9/3102; H04N 9/3105; G02B 2027/013; G02B 2027/0112; G02B 2027/0118; G02B 2027/0178; G02B 27/01; G02B 27/0101; G02B 27/0172; G02B 27/0179; G02B 27/1046; B60K 2370/23;
(Continued)

(56) References Cited

U.S. PATENT DOCUMENTS 7,034,778 B1    4/2006  Haehl
7,893,890 B2    2/2011  Kelly et al.
(Continued)

FOREIGN PATENT DOCUMENTS

EP    1154309 A1    11/2001
GB    2526159 A    11/2015

OTHER PUBLICATIONS

Yu-Kuo Cheng and Yen-Hsing et al., "64.3: Super-Gaussian Light Spread Function for High Dynamic Range Displays", SID 2008, 2008 SID International Sympo, Society for Information Display, Los Angeles, USA, vol. XXXIX, May 18, 2008, pp. 983-985, XP007016686, ISSN: 0008-966X.
(Continued)

*Primary Examiner* — Sultan Chowdhury

(57) ABSTRACT

The invention is directed to a head-up display 2 having a light source 231, a diffuser 232,235,236, a transmissive display 3, a mirror element 251 and a transmissive screen 21. According to the invention the head-up display 2 is further provided with a contrast enhancer display 4 that is arranged adjacent to the transmissive display 3.

9 Claims, 15 Drawing Sheets

(52) U.S. Cl.
CPC ...... *B60K 2370/23* (2019.05); *B60K 2370/25* (2019.05); *B60K 2370/33* (2019.05); *B60K 2370/52* (2019.05); *B60K 2370/785* (2019.05); *G02B 2027/0118* (2013.01)

(58) Field of Classification Search
CPC ............ B60K 2370/25; B60K 2370/33; B60K 2370/34; B60K 2370/52; B60K 2370/349; B60K 2370/785; B60K 2370/1529; G09G 2320/02; G09G 2320/066; G09G 2320/0233; G09G 2320/0242; G09G 2320/0626
See application file for complete search history.

(56) References Cited

U.S. PATENT DOCUMENTS

| | | | | |
|---|---|---|---|---|
| 9,013,790 B1* | 4/2015 | Kazmierski | .......... | G03B 21/567 359/443 |
| 2008/0218434 A1 | 9/2008 | Kelly et al. | | |
| 2008/0297908 A1* | 12/2008 | Adachi | ................ | G02B 5/0278 359/599 |
| 2015/0102980 A1* | 4/2015 | Pasca | ................. | G02B 27/0101 345/7 |
| 2016/0266391 A1 | 9/2016 | Han et al. | | |
| 2017/0032744 A1* | 2/2017 | Yoo | .................... | G02F 1/133512 |
| 2017/0258639 A1* | 9/2017 | Wu | .................... | G02B 27/0172 |
| 2018/0321477 A1* | 11/2018 | Kuksenkov | ........ | G02B 19/0061 |

OTHER PUBLICATIONS

Chun-Ho Chen et al., Effects of Backlight 1-9 Profiles on Preceived Image Quality for High Dynamic Range LCDs, Journal of Display Technology, IEEE Service Center, New York, NY, US, vo. 4, No. 2, Jun. 1, 2008, pp. 153-159, XP011334381, ISSN: 1551-319X, DOI: 10.1109/JDT.2007.916017.

Marc Albercht et al., "P-208L: Late-News Poster: LSF Correlator—An Amending Module for SSC Local Dimming Algorithm to Increase the Static Contrast of Edge-Lit LCDs", SID 11 Digest, P-208L, The Society for Information Display, 2011, vol. 42, pp. 1458-1461, ISSN: 0097-966XX/11/4203-1458, Published 2011.

Marc Albrecht, "Eine universelle Methode zur effizienten Berechnung von Local Dimming LED Backlight", Dissertation zur Erlangung des Grades des Doktors der Ingenieurwissenschaften der Naturwissenschaftlich—Technischen Fakultät II—Physik und Mechatronik—der Universität des Saarlandes, Universitat des Saarlandes, Published Sep. 27, 2010.

Tobias Jung et al., "System Architecture and FPGA-Implementation of the SSC Local Dimming Processor for an Edge-Lit Serial TV", SID Symposium Digest of Technical Papers, The Society for Information Display, OSSN 0097-966X/11/4202-0665, vol. 46, pp. 665-668, doi: 10.1889/1.3621410, Published 2011.

European Search Report dated Feb. 9, 2018 from corresponding European Patent Application No. 17465543.1.

International Search Report and Written Opinion dated Sep. 26, 2018 from corresponding International Patent Application No. PCT/EP2018/072478.

* cited by examiner

HEAD-UP DISPLAY AND METHOD FOR DRIVING A HEAD-UP DISPLAY

TECHNICAL FIELD

The invention is directed to a head-up display that is provided with light source, a diffuser, a transmissive display, a mirror element and a transmissive screen, and to a method for driving such head-up display.

BACKGROUND

U.S. Pat. No. 7,034,778 B1 discloses a colour head-up display for a vehicle using a transmissive LCD element. This known head-up display has the disadvantage that colour defects may occur at the transmissive LCD element.

EP 1 154 309 A1 discloses an LCD consisting of two active liquid crystal cells arranged next to each other. Both liquid crystal cells are provided for displaying a colour image. The second liquid crystal cell is driven such that it compensates for colour defects of the first liquid crystal cell. A general problem of LCD is that it cannot block completely the backlight in dark areas, so that an undesired effect appears on the displayed image seen by the user.

The publication "System Architecture and FPGA-Implementation of the SSC Local Dimming Processor for an Edge-Lit Serial TV", published in SID 11 Digest by Tobias Jung, Marc Albrecht et al. (ISSN0097-966X/11/4202-0665), discloses using an LCD element with a dimmable backlight. Such solution reduces the undesired effect mentioned above, but is costly.

It is desired to reduce the visibility of dark areas of a head-up display by relatively simple means.

SUMMARY

According to the invention, a head-up display is provided with a contrast enhancer display that is arranged adjacent to the transmissive display. This has the advantage, that the contrast enhancer display is arranged close to the transmissive display so that changes in the position of the user do not have a negative effect on the perceived image quality. The contrast enhancer display has a simpler function; an inexpensive off-the-shelf article can be used.

According to a preferred variant of the invention, a diffuser is arranged between the contrast enhancer display and the transmissive display. Such sandwiched arrangement has the advantage, that moiré pattern is reduced which may occur if alignment of contrast enhancer display and transmissive display is not perfect. If contrast enhancer display, diffuser and transmissive display are arranged as a single unit then the head-up display assembly is simplified. If the diffuser is arranged as a single diffuser film, a parallax effect caused by distance between contrast enhancer display and transmissive display is minimised. In this case it is advantageous to arrange another diffuser between light source and the single unit consisting of contrast enhancer display, diffusor film and transmissive display. If the alignment between contrast enhancer display and transmissive display is good enough as to prevent a disturbing moiré pattern, then no diffuser needs to be arranged between them.

Advantageously the contrast enhancer display and the transmissive display are bonded to each other. By this a parallax effect caused by the distance between contrast enhancer display and transmissive display is minimised. Contrast enhancer display and transmissive display are either directly bonded to each other or with an intermediate layer, for example a diffusor layer. If contrast enhancer display and transmissive display are places sufficiently close to each other, a parallax effect is also minimized.

For the skilled in the art, boding is not understood as a simple method in which several optical elements are not arranged in a fixed relative position mechanically (i.e. with the aid of holders, brackets or the like) but to be the process that is used to physically attach two or more optical media with the aid of an optically clear filler (adhesive, liquid polymer or any other substance suited) such that no air gap is present between the bonded media and that the refractive indices along the light propagation path are finely tuned to fulfil specific requirements, usually, to prevent spurious light reflections at the interfaces between different media. This process step usually induces a large fraction of the total system cost so is it used only if the net benefit more than surpasses the incurred costs. In the case of backlight units of display modules, the incurred costs of the bonding process do not offset the gains so the industry practice is not to use it in building display modules.

According to a preferred variant of the invention the contrast enhancer display and the transmissive display are based on a polarizer requiring display technology, for example LCD technology, and a single polarizer is arranged between the active areas of the contrast enhancer display and the transmissive display. This has the advantage that one polarizer is saved, as the single polarizer acts for both, contrast enhancer display and transmissive display. Respective other polarizers are oriented accordingly. According to another variant the contrast enhancer display and the transmissive display are also based on a polarizer requiring display technology, but each has two polarizers. This has the advantage that off-the-shelf components might be cheaper than the variant having only a single polarizer arranged between contrast enhancer display and transmissive display.

According to a preferred variant of the invention, the contrast enhancer display is arranged downstream of the transmissive display. This has the advantage that the contrast enhancer display is less exposed to heat and radiation from the light source. An inexpensive part can be used here, while the transmissive display anyway fulfils higher quality requirements.

According to a preferred embodiment of the invention the contrast enhancer display is arranged of contrast enhancer display pixels and the transmissive display is arranged of transmissive display pixels, wherein a single contrast enhancer display pixel corresponds to several transmissive display pixels. For example the contrast enhancer display pixels have double the side length of the transmissive display pixels thus one contrast enhancer display pixel corresponds to four transmissive display pixels. It was found that such a slightly larger pixel shape does not have a negative effect on the user experience. This arrangement has the advantage that the contrast enhancer display has a lower resolution and is thus less expensive. It is also possible to let a single contrast enhancer display pixel cover a red pixel, a green pixel and a blue pixel of a colour transmissive display, or multiple pixels of a certain colour. In case a contrast enhancer display with higher resolution than the transmissive display should be available at a better price or should come along with other advantages, also the use of such contrast enhancer display makes sense. In this case several pixels of the contrast enhancer display may be grouped to artificially create a lower resolution. According to another variant, such group of pixels may also extend partly on neighbouring transmissive display pixels in order to improve a light blocking effect. A higher resolution of the final image is reached if only a part of a pixel of the transmissive display passes the contrast enhancer display, so that an artificial high resolution transmissive display is reached.

A method for driving a head-up display according to the invention has the following steps: Detecting whether a pixel to be displayed is black. Setting the respective pixel of the contrast enhancer display to an "OFF" state if the pixel to be displayed is black, else setting the respective pixel of the contrast enhancer display to an "ON" state. Providing the value of the pixel to be displayed to a transmissive display, and providing the set value of the respective contrast enhancer display pixel to the contrast enhancer display. This is an easy to implement method for contrast enhancement of a transmissive display.

Advantageously the detecting step includes detecting the maximum value of colour values of the pixel to be displayed and the setting step includes setting the respective contrast enhancer display pixel to correspond to the detected maximum value. This is an easy to implement method if a colour transmissive display is used together with monochrome contrast enhancer display.

Advantageously, a normalising step is performed before the setting step and a de-normalising step is performed following the setting step. The exact position of the normalising step is not critical as long as it is done somewhere before the setting step. The normalising step may happen before or after the detecting step. This has the advantage that the detecting and setting steps can be implemented in the same way even if the input values vary between different types of head-up displays, e.g. having different bit depths. Implementation in the same way is also possible in case of adopting the light intensity of the head-up display to the light intensity of the environment, for example a day/night adaptation, or adaptation to sunshine, cloudy or rainy weather conditions.

BRIEF DESCRIPTION OF THE DRAWINGS

Further details, advantages and variants of the invention are provided in the following description of exemplary embodiments in the following figures, which show.

DETAILED DESCRIPTION

Figure 1:
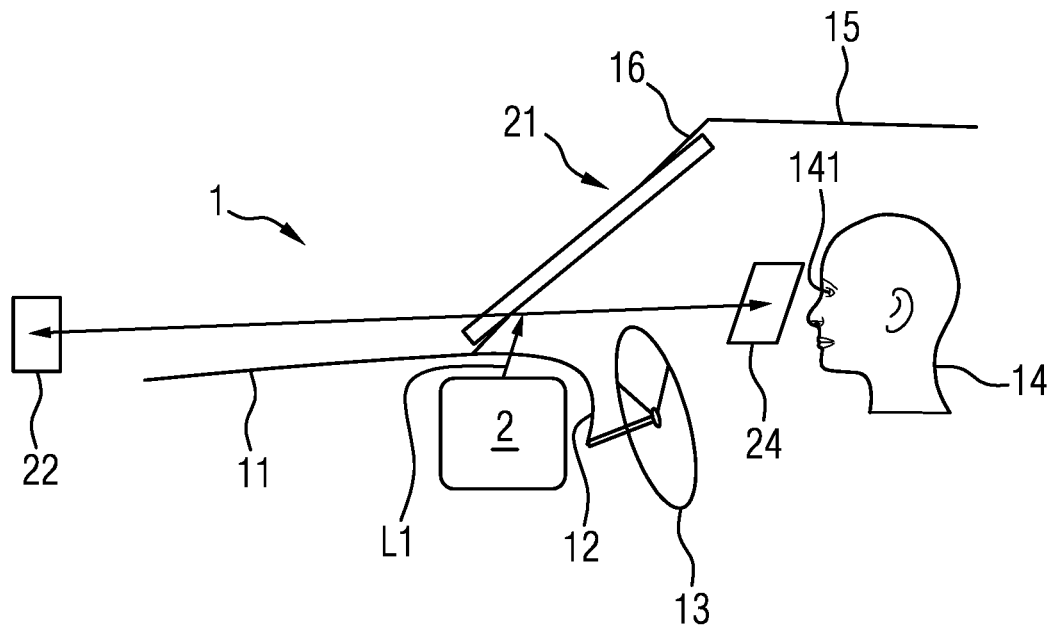
FIG. 1 a vehicle using an HUD
FIG. 2 an HUD
FIG. 3 an image projection system
FIG. 4 an ideal HUD image
FIG. 5 a real HUD image
FIG. 6 local backlight dimming in an HUD
FIG. 7 local backlight dimming algorithm
FIG. 8 typical HUD arrangement causing parallax effect
FIG. 9 parallax effect
FIG. 10 parallax effect
FIG. 11 bright halo shift due to parallax effect
FIG. 12 bright halo in an HUD with local dimming
FIG. 13 image projection system according to the invention
FIG. 14 contrast enhancer principle
FIG. 15 display according to the invention
FIG. 16 moiré effect
FIG. 17 display according to the invention
FIG. 18 display according to the invention
FIG. 19 layers of the display according to the invention
FIG. 20 layers of the display according to the invention
FIG. 21 algorithm according to the invention
FIG. 22 algorithm according to the invention
FIG. 23 display according to the invention
FIG. 24 display according to the invention

FIG. 1 shows a vehicle 1 using a head-up display 2, in the following also referred to as HUD 2. On the left side an engine hood 11 is visible. The HUD 2 is arranged below a dashboard 12. Behind the steering wheel 13, the driver's head 14 is shown. Between rooftop 15 and engine hood 11, a windshield 16 is arranged. The windshield 16 acts as a transmissive screen 21 of the head-up display 2. The HUD 2 generates optical beams L1, which are reflected at the transmissive screen 21 and fall into the driver's eye 141 as long as the eye 141 is within an area called eyebox 24. As long as the eye 141 is within the eyebox 24, the driver sees a virtual image 22 that appears to be outside the vehicle 1 in front of the windshield 16.

Automotive head-up displays 2 are used to convey critical vehicle information directly in the field of view of the vehicle's conductor or driver. The information is delivered to the driver at a certain distance so that no or nearly no accommodation of the driver's eye 141 is required when the driver switches from viewing the road in front of him to reading the vehicle's status shown as the virtual image 22. This approach reduces the reaction time of the driver by several hundreds of milliseconds, thus increasing road safety. At a speed of 120 km/h a 300 ms delay translates in a covered distance of about 10 m, which is about 10% of the total stop distance of the vehicle 1. As seen in FIG. 1, the HUD 2 creates a virtual image 22 ahead of the transmissive screen 21. The transmissive screen 21 can be the windshield 16 of the vehicle 1, as shown, or a different, dedicated, partially reflective surface separated from the windshield. Such surface is a so-called combiner. The virtual image 22 is visible from a limited region of space only, the so-called eyebox 24.

It should be clear to a person skilled in the art that the depictions in the described figures are only simplifications done for ease of understanding. The real life systems may differ in construction details without departing from the invention described with help of the figures. From this, it is to be understood that the used descriptive words should not be considered only for their basic meaning but also for equivalents.

The same reference signs are used for the same elements shown in the following figures. They are not necessarily described again, except they differ in function or such description seems meaningful with regard to the respective embodiment.

Figure 2:
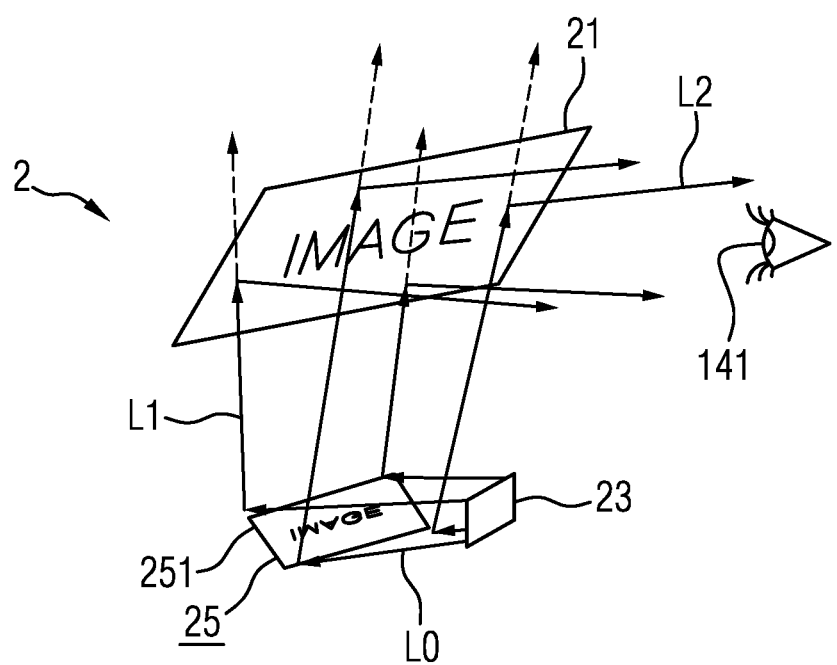

FIG. 2 shows an HUD 2 having an image generator 23, also referred to as image projection system below, that generates an optical beam L0. The optical beam L0 enters a generic optical system 25, here illustrated by an optical mirror 251, from which an optical beam L1 is directed to the transmissive screen 21. A part of the light of beam L1 passes through the transmissive screen 21, which is indicated by dotted arrows. Another part is reflected by the transmissive screen 21 and thus reaches the driver's eye 141 as optical beam L2.

Figure 3:
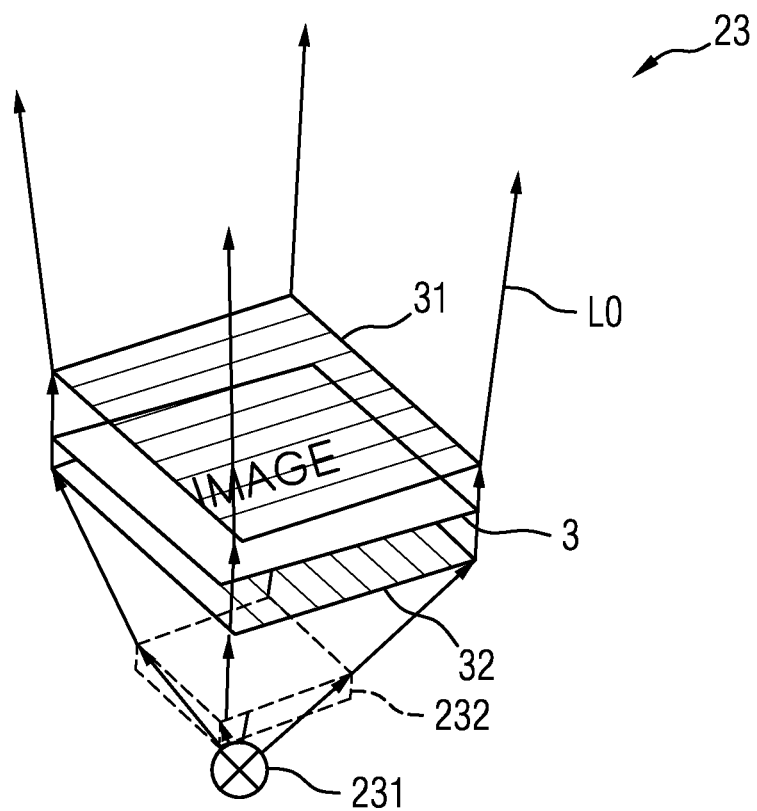

FIG. 3 shows an image projection system as image generator 23 having a light source 231, a diffuser 232, a transmissive display 3, for example a liquid crystal display (LCD). At the front side of the transmissive display 3 a front polariser 31 is arranged, at the backside a back polariser 32. The beam L0 leaves the image generator 23.

HUD systems as depicted in FIG. 2 and FIG. 3 usually consist of an image generator 23 coupled to an optical system 25 that directs the image formed by the image generator 23 onto a transparent screen, the transmissive screen 21. In the example shown, the image generator 23 is provided with a backlight unit, the light source 231, which for example uses LEDs, laser beams or is of any other type of light source. The image generator is further provided with an image forming system that may be a set of sweeping mirrors, micromirror arrays using MEMS technologies or, as shown in FIG. 3, an active matrix liquid crystal display constructed on a flat, rigid glass backplane. The essential parts of the image generator 23 for an LCD-based system as illustrated in FIG. 3 are the backlighting source, the light source 231, together with the diffuser 232 which may be a simple diffuser film or a mixed function film like a combination of a diffuser and a brightness enhancing film, the front and back polarising films 31, 32 and an LCD, the image forming transmissive display 3.

The light source 231 illuminates the entire useful area of the transmissive display 3 as, usually, there is no a priori knowledge of where the generated symbols will be shown on the display 3. Thus, the entire usable surface of the display 3 needs to have the same properties. The generic optical system 25 may consist of one or several lenses and/or planar or non-planar mirrors. These have the purpose of conducting the optical information from the image generator 23 to the transmissive screen 21 and to transform the optical image in such a way as to create a virtual image 22 situated several metres in front of the driver's head 14. The transmissive screen 21 may consist of a dedicated transparent screen called combiner, placed in front of the driver's head 14, for example close to the vehicle's windshield 16 or glass canopy. For the sake of simplicity, the term transmissive screen 21 is used herein independent of the actual implementation of the HUD system. The purpose of the transmissive screen 21 is to alter the optical path in such a way that a part of the light generated by the image generator 23 and the generic optical system 25 is directed towards the head 14 of the driver.

Figure 4:
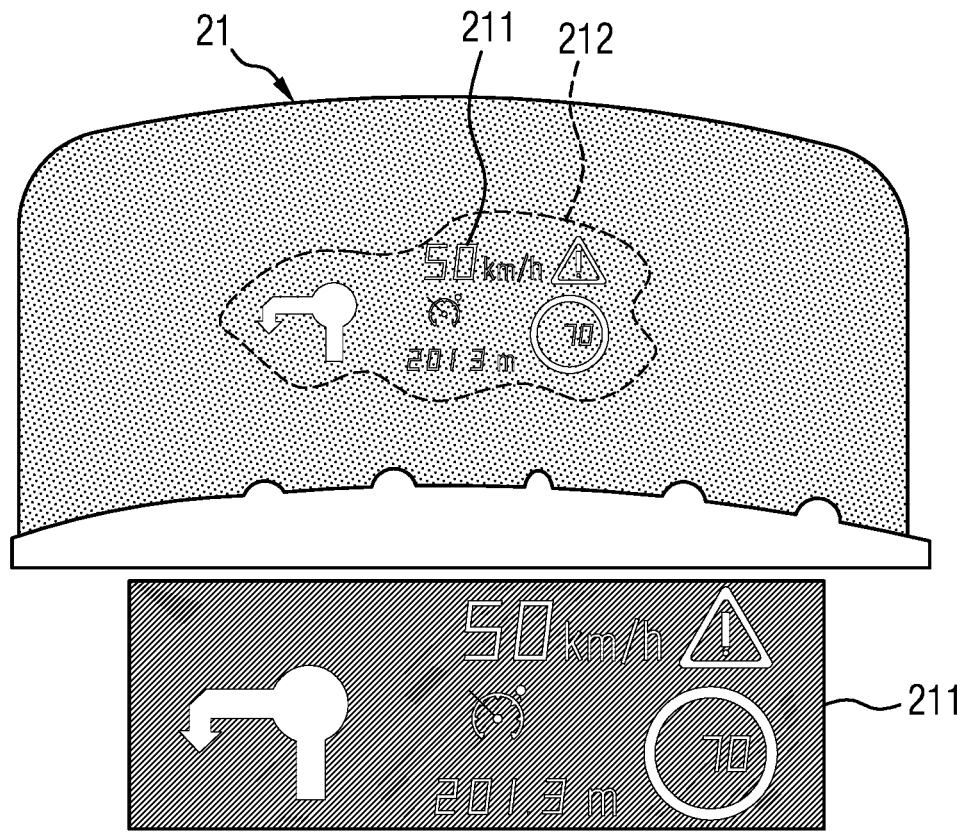

FIG. 4 shows an ideal HUD image on a transmissive screen 21, here a so-called combiner. Below the transmissive screen 21 an arrangement of symbols 211 to be displayed is indicated. The symbols 211 use the symbol area 212 indicated by the dashed line on the transmissive screen 21. An important aspect of any HUD system is to generate the virtual image 22 without introducing any other visible artefacts. In the ideal case, the HUD system only produces the needed symbols 211, as shown in FIG. 4. In the ideal case, such view can be produced by displaying the required symbols 211 on a black background as seen in the lower part of FIG. 4.

Since the image generated by the HUD system is overlayed on the scene in front of the driver, the black portions of the display 3 will be fully transparent as no supplemental light is added to the scene. The symbol areas, since they act like light sources, will appear blended into the scene as the light generated by them adds to the rest of the scenery. In reality, the transmittance of the display 3 cannot be Zero so that the display background is not fully dark. This results in stray light produced by the inactive areas. This stray light will also add to the scenery in front of the driver, potentially generating an undesired or irritating visual impression. In order to minimise the impact of the stray light, the transmittance of the display 3 for the black regions should be very low.

Figure 5:
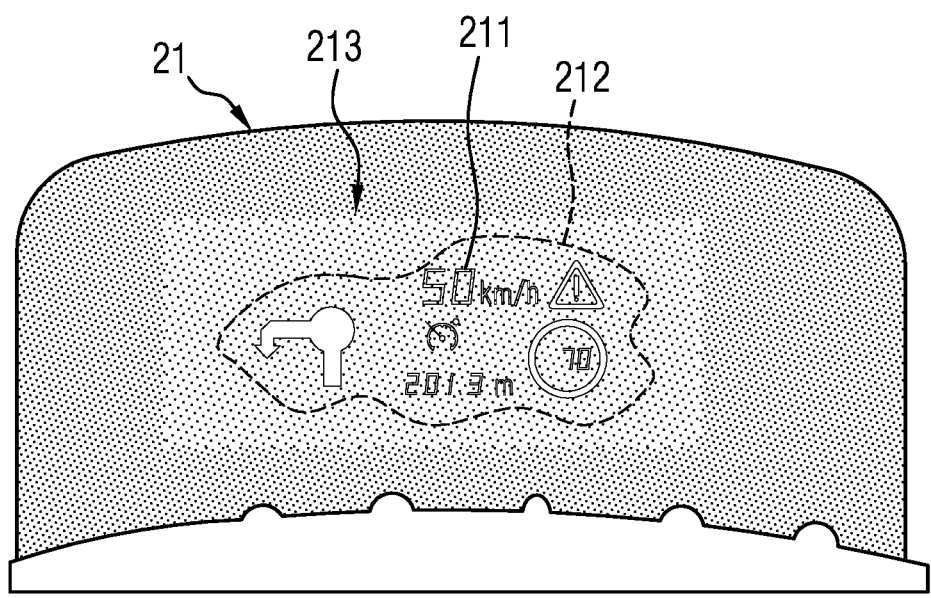

FIG. 5 shows a real HUD image on a transmissive screen 21. Inside the symbol area 212 the symbols 211 to be displayed are visible in bright white or bright colour. Surrounding the symbol area 212 a so-called postcard area 213 is visible. This area 213 is illuminated by the display 3 that, in real cases, does not have the complete black background as shown in the lower part of FIG. 4, but has a slightly illuminated background.

For a typical system application the requirement of a low transmittance for the black regions translates in very high contrast ratios for the used display 3. Ideally, the contrast ratio should be larger than 5000:1. For LCD types, such high contrast ratio can be reached only with special construction techniques, that are usually not suited for mass produced systems. Another possibility to reach such very high contrast ratio is to use a special technique to generate the backlight of the image generation unit in such a way that the light intensity is modulated in correlation with the image content. This technique is also called local dimming. In this technique, local backlight areas can be dimmed if they are illuminating portions of the display that are not showing any information. This technique artificially increases the equivalent contrast ratio of the display 3. It is to be mentioned that there are also other possibilities to improve the HUD image perception, like modulating the transmittance of the transmissive screen 21 according to the ambient lighting conditions. This means: in bright light, the transmissive screen 21 is darkened while in low light conditions the transmissive screen 21 is more transparent. This allows a lower maximum brightness of the virtual image 22 to be seen in most practical situations. However, especially if the transmissive screen 21 is the windshield 16, the technique may not be applicable in the automotive industry where there are strict requirements for the minimum transmittance of the windshield 16.

Typical system applications are using displays 3 with contrast ratios typically larger than 800:1 to 1000:1 for the image generator 23. Given the desired maximum brightness of the symbols 211 shown by the HUD system, the contrast ratio limits the minimum brightness of the display background and, hence, makes it impossible to produce completely dark areas. Since the background of the HUD symbols 211 will not be a perfect black, the light coming from the background area still produces a visual impression for the driver, similar to that of FIG. 5. The effect is often called a "postcard effect" as the symbols 211 generated by the projection system appear as if they were part of a transparent postcard placed in front of the user of the HUD 2. Even with these very high contrast ratios there are situations, especially in lowlight conditions, where the HUD generated image still shows a postcard effect. Since the human eye is very good at discerning even small sharp contrast changes, so-called edges, an effect easily seen as "Mach bands" in luminance grating images, the boundary of the background postcard effect is easily discernible, decreasing the quality of the driver experience. Because of this effect, extensive resources are spent for improving the contrast ratio of display systems usually found in automotive HUD applications. This may include specially designed LCD displays incurring high per-unit costs for the display. This may also include special backlight techniques, like local backlight dimming which incurs high system complexity. It may also include using different niche display technologies like laser beam scanners or digital micro mirror arrays which have lower maturity levels for automotive applications than state-of-the-art LCDs, usually having a higher per-unit price, leading to higher overall system costs. As a side effect of the high system costs, the HUD systems are usually targeted at mid to high or premium class vehicles.

Figure 6:
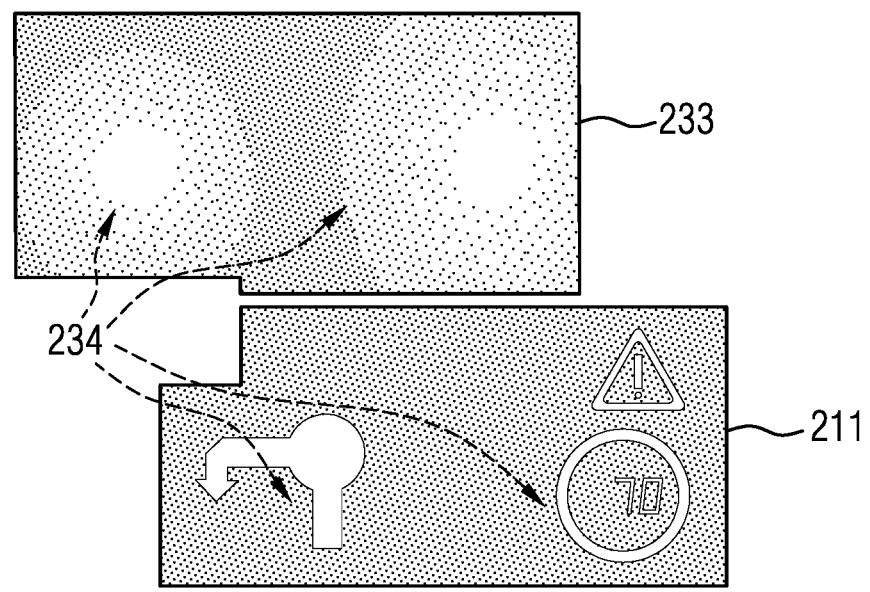

FIG. 6 shows backlight dimming in an HUD 2. In the lower part of the figure, symbols 211 actually to be displayed are shown. In the upper part the locally dimmed backlight appearance 233 is shown. Dashed arrows 234 indicate, where bright areas of the dimmed backlight 233 match the positions of the shown symbols 211. For the automotive mature technology using liquid crystal displays, as stated, one of the preferred contrast increasing measures is using a local backlight dimming approach. In this approach, as seen in FIG. 6, the backlight of the unit can be controlled in a local zone basis in such a manner as to provide light only in areas where symbols 211 should be displayed in front of the driver. In this way, the postcard effect is reduced as unused screen areas will not produce a visual impression. However, this approach has several drawbacks stemming directly from the operating principle.

Figure 7:
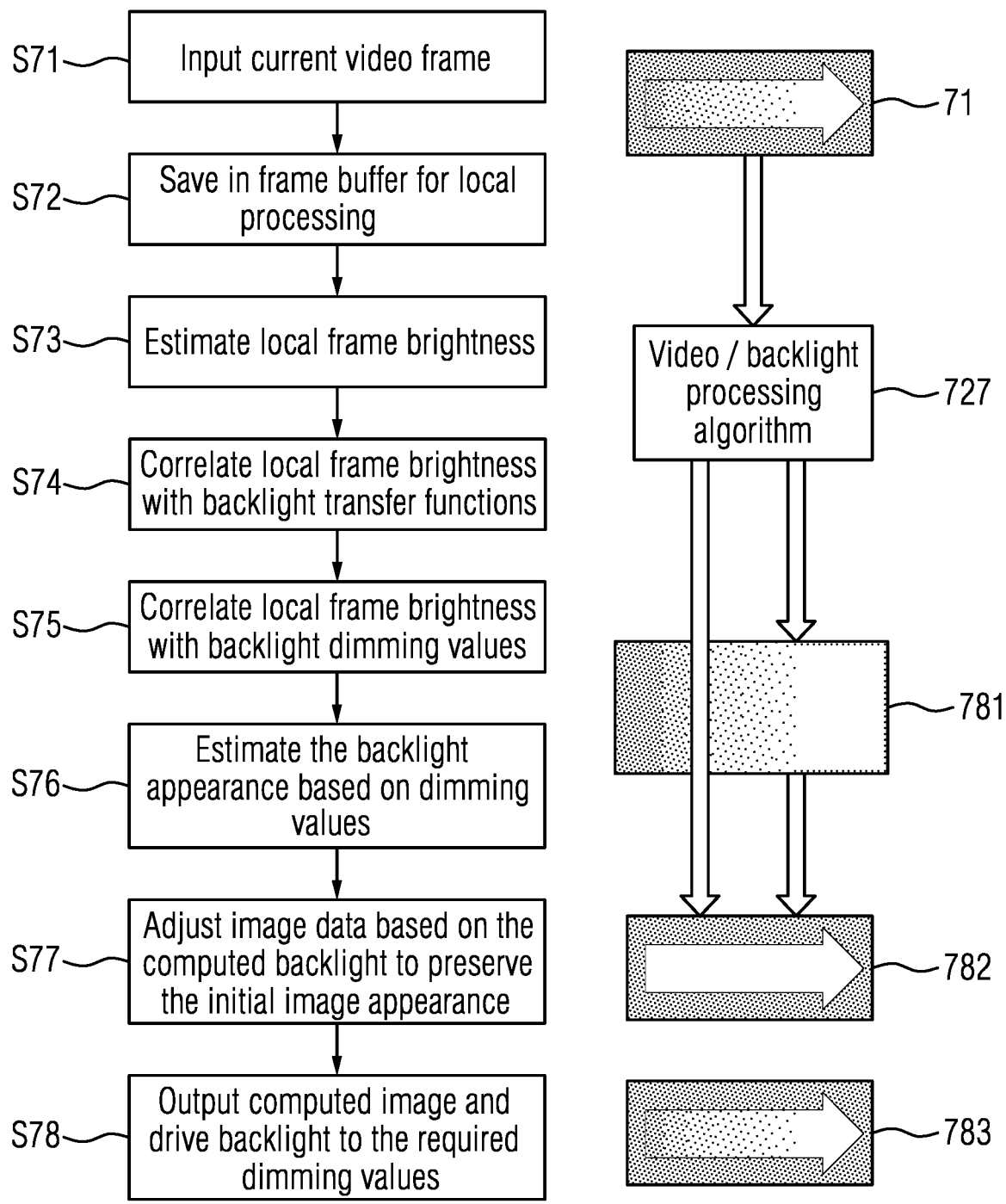

FIG. 7 shows a backlight dimming algorithm illustrating the operating principle. In step S71 a current video frame is input. In step S72 the video frame is saved in a frame buffer for local processing. In step S73 the local frame brightness is estimated. In step S74 the local frame brightness is correlated with a backlight transfer function. In step S75 the frame brightness is correlated with backlight dimming values. In step S76 the backlight appearance based on dimming values is estimated. In step S77 the image data is adjusted based on the computed backlight in order to preserve the initial image appearance. Finally, in step S78 the computed image is output and the backlight is driven according to the required dimming values. On the right side of FIG. 7 the image 71 as it should be seen based on the current video frame of step S71 is shown. It is input to the processing algorithm 727 as described in the steps of the left side. Result of step S78 of the processing algorithm 727 is the locally dimmed backlight 781 and the image 782 as shown on the display 3. Overlay of locally dimmed backlight 781 and image 782 result in the image 783 as perceived.

A drawback of the local dimming scheme is the required system complexity. For each image that is to be displayed on the HUD 2, the image generator 23 has to analyse the entire image to assess the needed backlight brightness for each pixel and to create an image brightness map. In the next steps the system has to correlate the image brightness map to the backlight transfer functions, step S74. By this, the effect of each individual local backlight zone is calculated. Based on that, the optimum individual backlight dimming values are generated. The optimum values can be selected based on several optimisation criteria, like to achieve no image artefacts or to achieve the minimum backlight power. As a next step, the image generator 23 estimates the appearance of the entire display backlight based on the optimum dimming values and the backlight transfer functions, step S76. Finally, the system adjusts the initial image such that, when displayed on the display in combination with the generated locally dimmed backlight, the final appearance closely matches the original image 71. FIG. 7 illustrates the described algorithm. Since an HUD 2 must show dynamic images, usually with a frame rate of 50 or 60 frames per second, the described algorithm has to be applied for each frame, resulting in a higher requirement for the image processing power. Additionally, since the system needs to construct the image brightness map and to correlate it with a backlight transfer function, it needs to locally store a version of the input image. This translates in a requirement for frame buffer memory, adding even more cost and complexity to the system.

Figure 11:
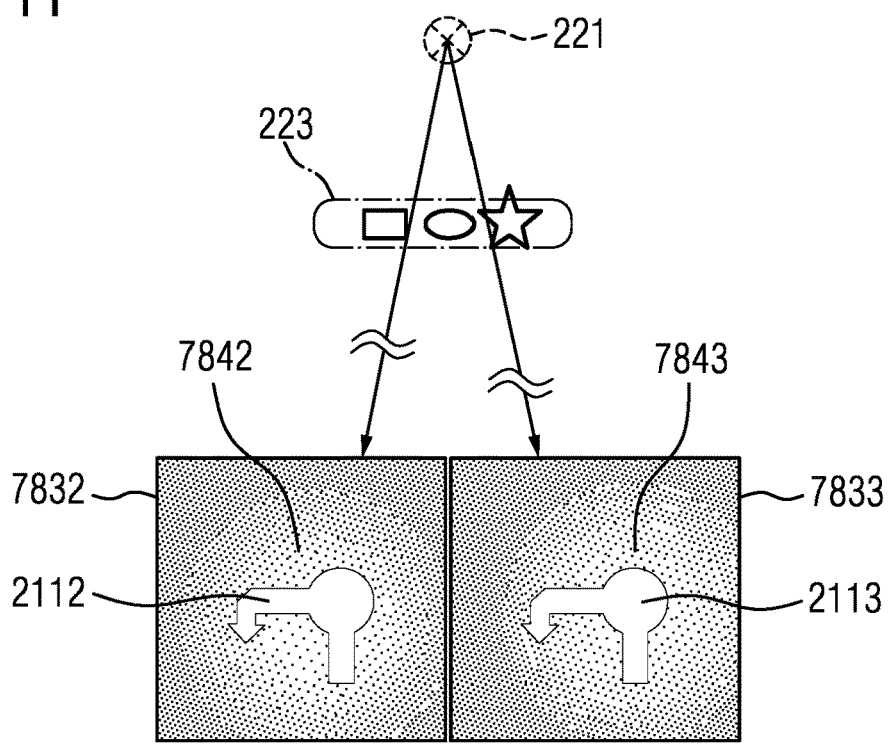

Although the local dimming backlight scheme does not produce a postcard effect, it still generates halo 7842, 7843 around the displayed symbols 2112, 2113, see FIG. 11. This comes from the fact that local backlight units cannot follow the shape of the shown symbols and, therefore, illuminate a larger display area than needed. Because the display contrast ratio is finite, the illuminated background will transmit a portion of the backlight, creating an area that is brighter than the unilluminated background.

Figure 8:
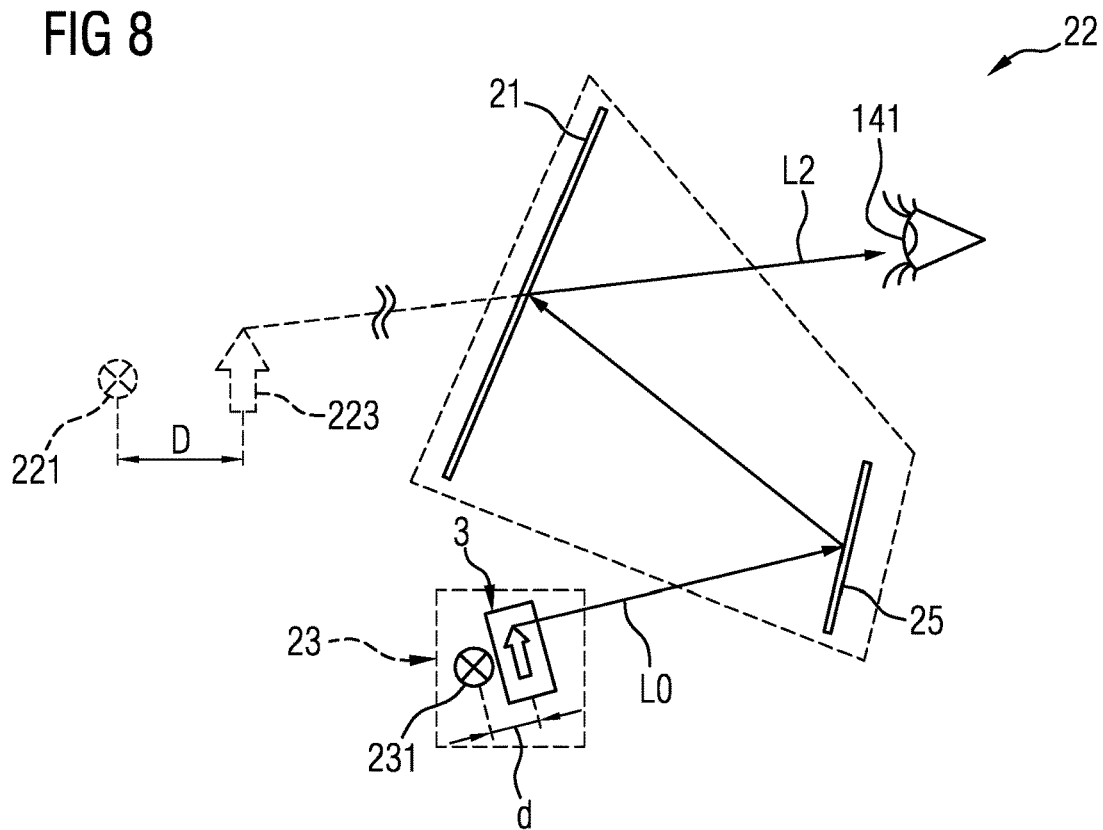

FIG. 8 shows an arrangement causing parallax effect. The light source 231 and the display 3 of the image generator 23 are separated by a distance d. The beam L0 generated by the image generator 23 passes the generic optical system 25 and is reflected by the transmissive screen 21 to reach the driver's eye 141 as optical beam L2. In the virtual image 22 the virtual image 221 of the light source 231 and the virtual image 223 of the display 3 appear at a virtual distance D. The virtual distance D is larger than the separation distance d. This shows another drawback of the local dimming scheme as applied to HUD systems. Due to the fact that the backlight unit, the light source 231, is arranged at a certain distance d behind the image displaying device, the display 3, a parallax effect occurs. Usually, since the projection distance of the virtual image 22 created by the HUD 2 is larger than the distance between the display 3 and the transmissive screen 21. The optical system 25, between the image generator 23 and the transmissive screen 21 provides a specific magnification. This magnification affects also the apparent distance between the virtual image 223 of the display 3 and the virtual image 221 of the light source 231 as seen in the virtual image 22. The light source 231 usually is not directly bonded to the display 3 but is arranged at a certain distance d behind the backside of the display 3. Thus, the driver will perceive this as if the light source 231 was magnified and arranged at a distance D behind the virtual image 223 of the display projected by the HUD 2. This may create a parallax effect when the driver changes the position of his eye 141 in the systems eyebox 24.

Figure 9:
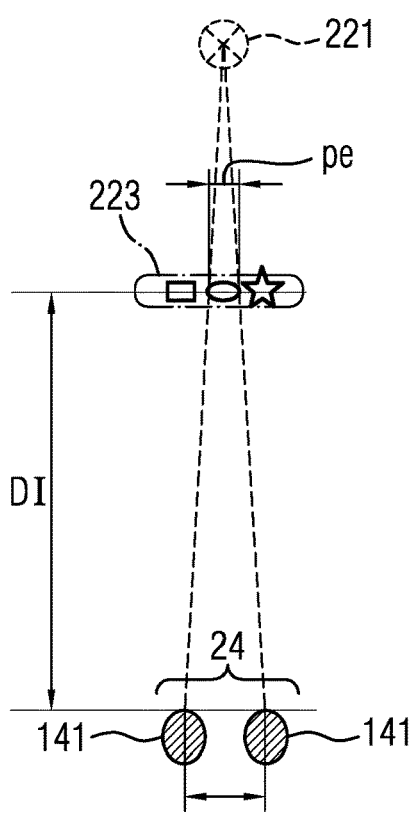

FIG. 9 shows this parallax effect. It diagrammatically shows the virtual image 221 of the light source 231 that appears behind the virtual image 223 of the display 3 which itself is a distance DI away from the driver's eye 141. The driver's eye 141 is shown in two positions that lie within the eyebox 24. Dotted lines show the line of sight for these different positions. The parallax effect is the distance pe between the two lines of sight on the virtual image 223 of the display 3. For the local dimming background generation, the parallax effect may create two side effects that are degrading the driver's experience. The first negative side effect comes from the combination of the image processing algorithm for local dimming and the shift in apparent backlight position. As seen in FIG. 9, when the driver shifts his head in different positions inside the eyebox 24, the virtual image 221 of the light source 231 is seen behind the virtual image 223 as if it was illuminating different parts of the virtual image 223 of the display 3.

Figure 10:
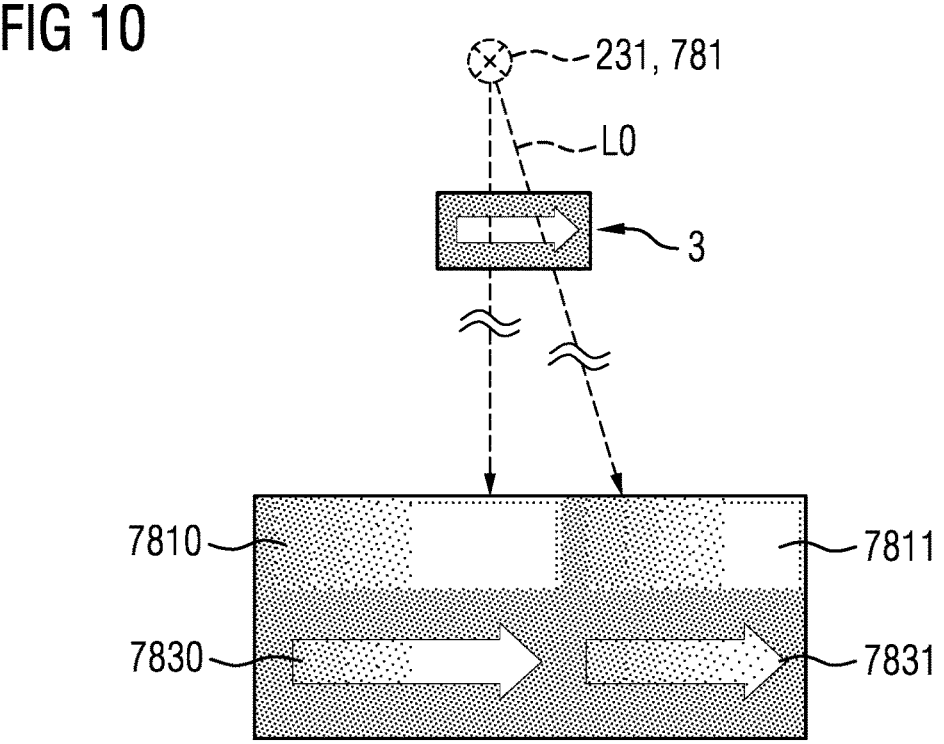

FIG. 10 shows a parallax effect when using the locally dimmed backlight. The light source 231 is in this case the locally dimmed backlight 781 that generates an optical beam L0 that passes through the display 3. Due to the parallax effect the backlight 7811 as seen from the right side is shifted compared to the backlight 7810 as seen from a correct middle position. The image 7831 as seen from the right side has thus a brightness distribution that is shifted compared to the image 7830 as seen from the middle position. As the driver changes position within the eyebox 24, from the driver's perspective, the relative shift between the locally dimmed backlight 781 and display 3 is different, so the perceived images 7830 and 7831 differ in their brightness distribution. As the image processing algorithm computes the local dimming values and the adjusted image 782 that is to be displayed based on a fixed position of the backlight 781, this parallax effect translates in a correct image appearance 7830 only for the middle driver position. If the driver changes his position, as seen in FIG. 10, the correlation between the input image and the perceived image 7830, 7831 degrades. This degradation is directly proportional to the displacement from the nominal position. That means, the larger the displacement, the larger is the difference between the intended and the perceived images 7830, 7831.

Another negative side effect of the parallax effect is illustrated in FIG. 11, showing the changes in halos due to parallax effect. It shows the virtual image 221 of the light source, the virtual image 223 of the display and the perceived image 7832 as seen from a middle position and another perceived image 7833 seen from a shifted position. The locally dimmed light source 231 generates a halo 7842 that is centred to the displayed symbol 2112 in the perceived image 7832 on the left side while the halo 7843 is shifted to the right side with regard to the displayed symbol 2213 in the perceived image 7833 shown on the right side. This negative effect stemming from the parallax effect is especially visible in lowlight conditions, where the driver might perceive the illuminated background.

As the driver's eye 141 shifts inside the eyebox 24, the parallax effect, as mentioned earlier, seems to illuminate different parts of the active area. To the driver this translates in changes of the position of the halo 784X relative to the shown symbols 211X, which is directly dependent on the offset from the nominal driver position.

Figure 12:
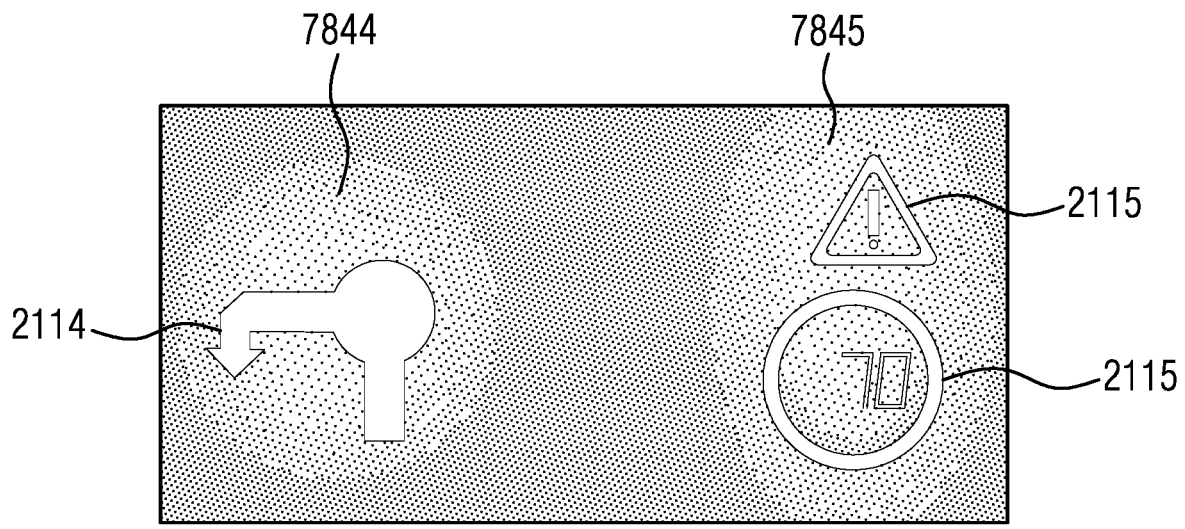

FIG. 12 shows halo in an HUD 2. As different symbols 2114 and 2115 are displayed, two different halos 7844 and 7845 are visible especially in low light conditions. The symbols 2114 and 2115 are to be displayed on relatively spaced positions. As the generated symbols 2114, 2115 will be perceived with halos 7844 and 7845 around them, having two or more disjoint symbol areas means that the driver will see two or more halos 7844, 7845 in his field of view. Moreover, as the position and/or shape of the symbols 2114, 2115 can change dynamically, also the position and/or the shape of the halos 2844, 2845 will change accordingly, accentuating the undesired visibility of the halos 7844, 7845.

There can be a very big difference between the maximum brightness of displayed symbols 2114, 2115 and the minimum brightness of the background when no symbols are shown. In this case there is a reduced or absent backlight yielding an artificial contrast ratio possibly larger than 100,000:1. Because of the halo effect, with light leaking from the bright areas to the background, the effective display contrast ratio is only several times larger than that of the initial display. It is in the range of 5000:1 up to about 50,000:1 for a display with an initial contrast ratio of 1000:1. That means there is improvement of 5 to 50 times. Moreover, in the area close to the shown symbols 2114, 2115, the contrast ratio is identical with that of the initial display. The present invention eliminates the postcard effect without the cost penalties incurred by the state-of-the-art approaches and without introducing additional negative effects like multiple halos 7844, 7845 around shown symbols 2114, 2115 or image degradation because of the combination of the image processing and the apparent backlight shifting.

Figure 13:
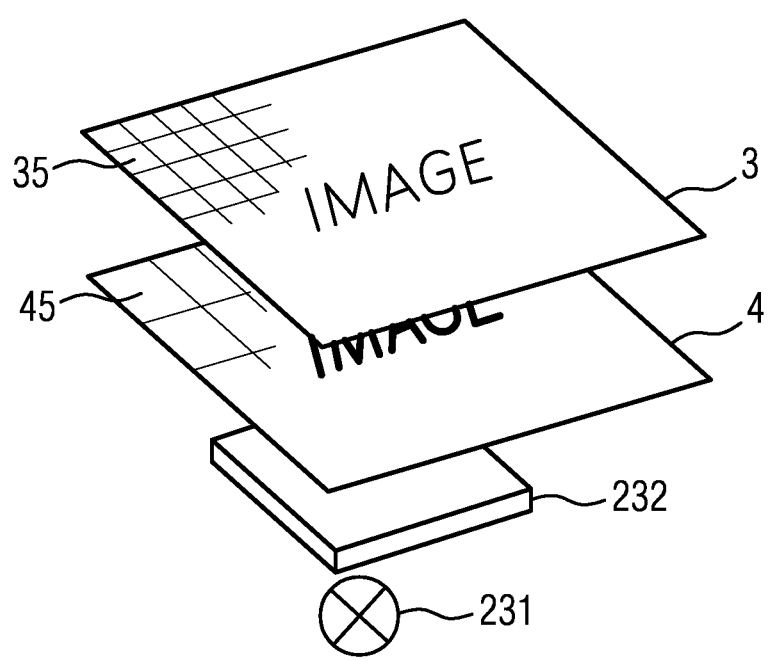

FIG. 13 shows an image projection system according to the invention. Similar as shown to FIG. 3, there is a light source 231, a diffuser 232 and a transmissive display 3. Front and back polarisers are not shown here but are implemented in the usual way. The contrast enhancer display 4 is arranged between diffuser 232 and display 3. This figure shows a diagrammatic view with only the most important elements necessary to describe the invention. In reality, an actual system may comprise additional layers like additional polarizers, light-control films, Fresnel lenses and the like. With the contrast enhancer display 4 placed between the diffusor 232 and the transmissive display 3, the contrast enhancer display 4 acts as light modulator. It produces an illumination for the transmissive display 3 that is strongly correlated with the image to be shown on the transmissive display 4.

In the upper left part of the transmissive display 3 a grid of transmissive display pixels 35 is indicated. These are not to scale and are only shown in a part of the area for simplicity. Also in the upper left part of the contrast enhancer display 4 a grid of contrast enhancer display pixels 45 is indicated. These are also not to scale and are only shown in a part of the area for simplicity. It can be seen that in this embodiment the display pixels 35 are smaller than the contrast enhancer display pixels 45, so that four display pixels 35 correspond to a single contrast enhancer display pixel 45. In reality, both types of pixels 35, 45 are much smaller to allow for a good display resolution. Of course, other ratios larger or even lower than 2:1 are possible as well.

Without requiring a high contrast ratio display 3 or a very high system complexity, the postcard effect is highly attenuated by the use of a secondary transmissive display as contrast enhancer display 4 interposed between the light source and the transmissive display 3. The type of the contrast enhancer display 4 is not a limiting factor for the invention. The invention works independent of the actual display type. The target is to get a display with the transmittance as high as possible, but since the needed contrast ratio can be even as low as 5:1, it is estimated that it will be possible to achieve 50% transmittance for simple black/white LCD. The construction of the active area of the contrast enhancer display 4 preferably follows as close as possible the construction of the transmissive display 3. This means, if the transmissive display 3 is of a segmented type, the contrast enhancer display 4 should also be a segmented display. If the transmissive display 3 is of a dot-matrix type, either passive or active, also the contrast enhancer display 4 should be of a dot-matrix type. If both displays are of the dot-matrix type, it is not necessary for both of them to be of the same subtype. Usually, the display 3 is of an active matrix type but the contrast enhancer display 4 may also be constructed as passive matrix display. The same effect can be achieved if the transmissive display 3 is of the dot-matrix type and the contrast enhancer display 4 is a segmented display. Also the transmissive display 3 may be a segmented display and the contrast enhancer display 4 may be the dot-matrix display. Any other mix of appropriate technologies may take advantage of the inventive idea. If both, display 3 and contrast enhancer display 4, are constructed as dot-matrix displays, there is no direct requirement for them to have the same resolution.

The purpose of the contrast enhancer display 4 is to pre-modulate the backlight intensity in such a way as to transmit light as much as possible only towards the symbols shown on the transmissive display 3 and, at the same time, to block light as much as possible all over the background. For instance, assuming the contrast ratio for the contrast enhancer display 4 of 50:1, the light that is transmitted towards the transmissive display 3 from the clear areas of the contrast enhancer display 4 will be fifty times brighter than that transmitted from the black area. Assuming the front display is showing the same content over its entire surface because the backlight source 231 is already modulated by the contrast enhancer display, regions of the transmissive display 3 that are illuminated from the clear areas of the contrast enhancer display 4 would be fifty times brighter than those illuminated by the opaque areas of the contrast enhancer display 4. If the transmissive display 3 is configured to show a fully black image, the areas of the transmissive display 3 that are in front of the contrast enhancement display 4 opaque areas will be fifty times less bright than the remainder of the surface. This means that with the addition of the secondary display as contrast enhancer display 4, the black level of the display 3 as seen by the driver using the HUD system will be fifty times better than the initial black level. If the clear areas of the contrast enhancer display 4 are aligned with the symbols that are to be shown on the front display, the driver would perceive for the head-up display 2 symbols at normal brightness but 50 times darker background than if the display 3 would have been fully illuminated by the clear contrast enhancer display 4 areas. This effectively increases the front display contrast ratio by 50 times, which is the amount given by the contrast ratio of the contrast enhancer display 4. It should be stressed that the contrast enhancer display 4 may be of any transmissive display technology type, without being limited to these, like liquid crystal displays, electro-wetting, MEMS type displays, like optical electro-shutter displays, telescopic pixels displays or even electromechanical shutters. Unlike the display 3, the optical performance of the contrast enhancer display 4 is much more relaxed. The only critical parameter being the transmittance of the contrast enhancer display 4. Since the contrast enhancer display 4 works like a pre-modulator for the backlight generated by the light source 231, it is important to transmit as much light as possible from the clear areas. Assuming a typical state of the art contrast ratio for the transmissive display 3, the front display, of 1000:1, even if the contrast ratio of the contrast enhancer display 4 is only 5:1, the resulting contrast ratio for the head-up display system would be 5000:1. This is similar to what can be achieved using the local dimming driving scheme. Even more, unlike for the local dimming technique where the contrast ratio in regions near the displayed symbols 211 is equal with the contrast ratio of the initial display the technique disclosed here provides a constant, improved, contrast ratio for the entire display area.

Figure 14:
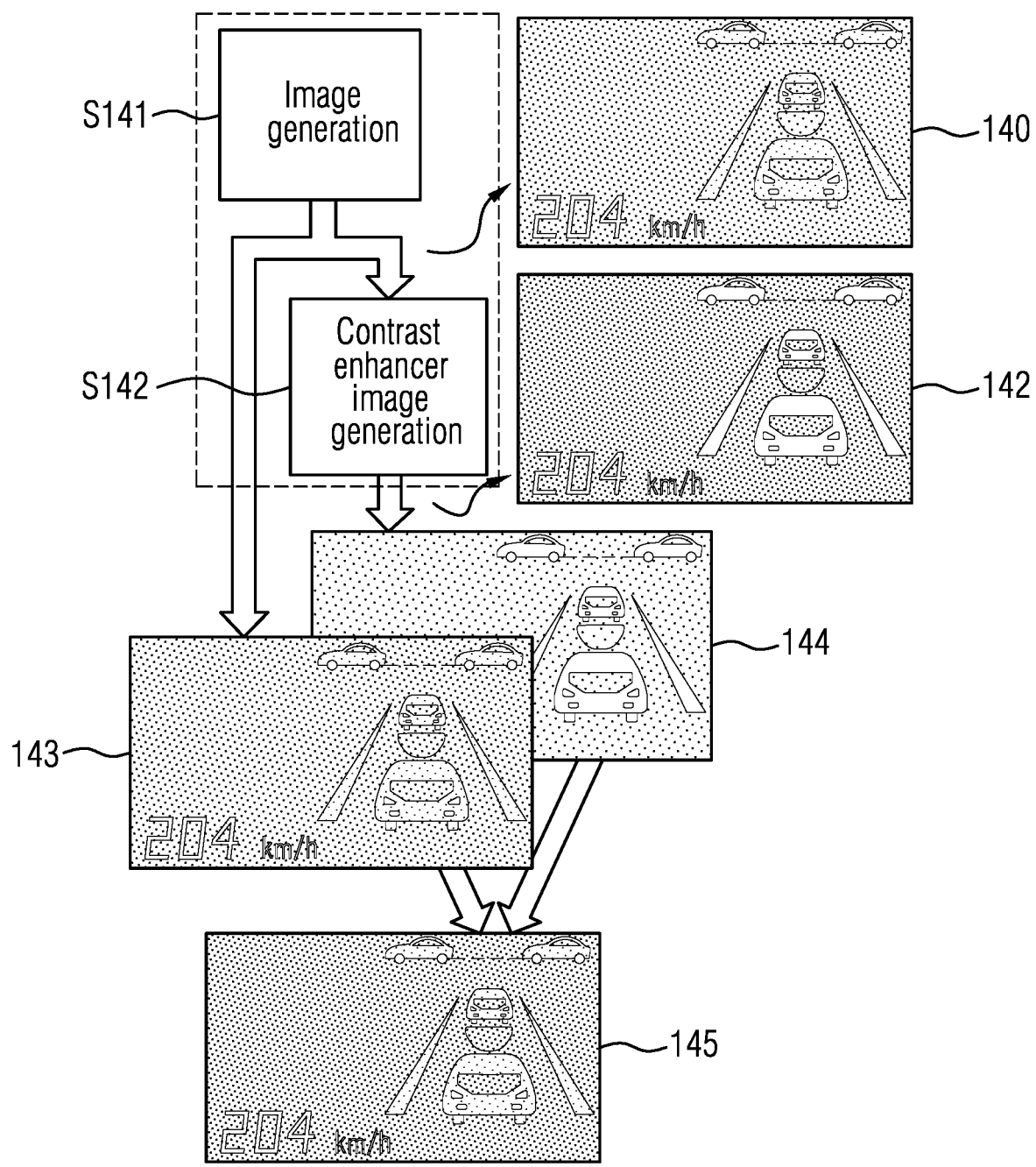

FIG. 14 shows a contrast enhancing principle according to the invention. In step S141 an image is generated from the current video frame input. The ideal image 140 is shown on the right side. If displayed by the transmissive display 3 it looks like the displayed image. The ideal image 140 is used to generate a contrast enhanced image 142 shown on the right side in its ideal form. Displayed on the contrast enhancer display 4 it looks like the displayed contrast enhancer image 144 in step S142, as shown below. The combination of both, the displayed image 143 and the displayed contrast enhanced image 144 lead to the virtual image 145 as perceived by the driver. It can be seen that it provides nearly the contrast of the ideal image 140 and has no postcard effect or at least a much lower postcard effect than the displayed image 143 would have without contrast enhancer display 4.

As the function of the contrast enhancer display 4 is to pre-modulate the light that reaches the front display 3, there is no real need for the contrast enhancer display 4 to be a colour display. In fact, for the preferred embodiments the contrast enhancer display 4 can be just black and white, allowing a simple on/off modulation of the light for the transmissive display 3. Yet another preferred embodiment has the contrast enhancer display 4 as a greyscale device, allowing a more refined modulation of the light. The contrast enhancer display might also be of a colour display type without departing from the scope of the present invention.

Figure 15:
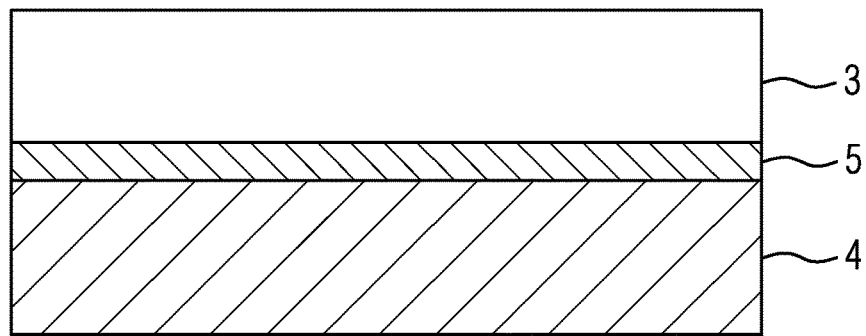

FIG. 15 shows a display according to the invention. A bonding layer 5 bonds the transmissive display 3 and the contrast enhancer display 4 together. This eliminates the parallax effect, as the contrast enhancer display 4 is placed as close as possible to the transmissive display 3. Preferably, the contrast enhancer display 4 is directly bonded to the backside of the transmissive display 3. The described display may also be arranged upside-down in the head-up display 2, thus having the contrast enhancer display 4 downstream of the transmissive display 3.

Figure 16:
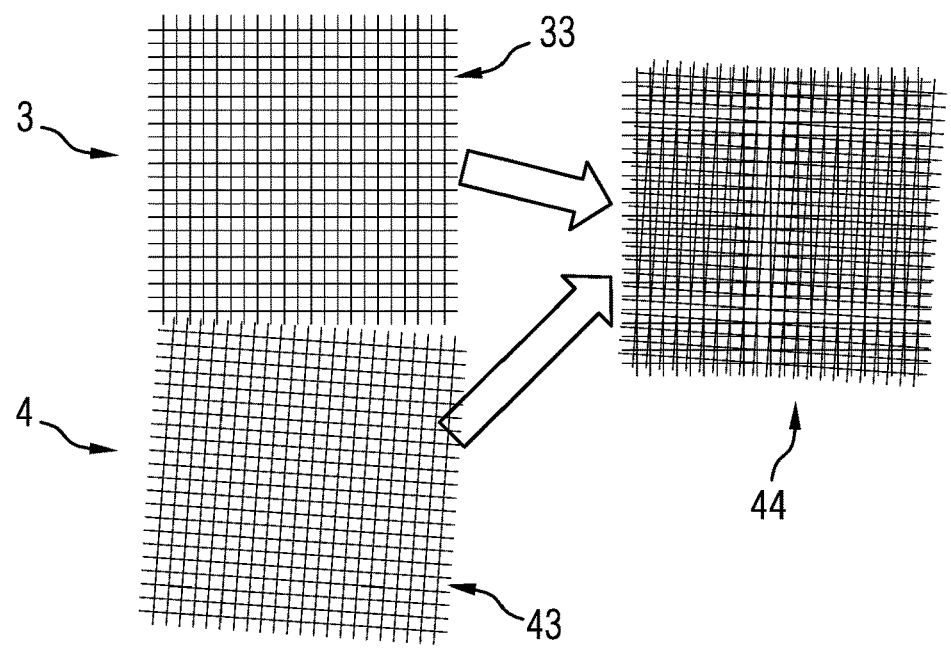

FIG. 16 shows the moiré effect that may occur if the transmissive display 3 and the contrast enhancer display 4 are implemented as dot-matrix displays. In such case, care must be taken to minimise the possible moiré effect. In the upper left part of the figure, the transmissive display 3 is shown with its display pixel grid 33. Below this, the contrast enhancer display 4 is shown with its display pixel grid 43. As can be seen, the two grids 33, 43 are not well aligned. When they are overlaid, the moiré pattern 44 appears as shown on the right side. The two displays 3, 4 should thus be perfectly aligned to reduce moiré pattern.

Figure 17:
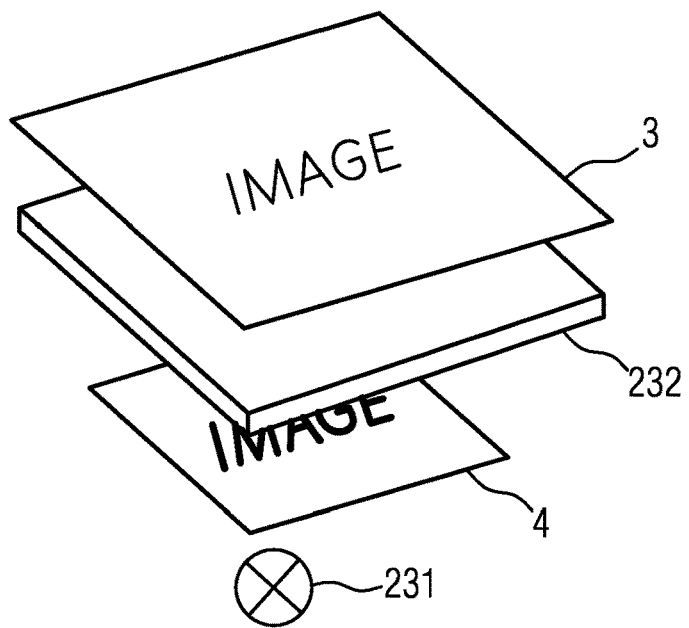

FIG. 17 shows a display according to the invention wherein the moiré effect is prevented even without perfect alignment. Here, the diffuser 232 is placed between the contrast enhancer display 4 and the transmissive display 3. The image displayed on the contrast enhancer display 3 is, in this case, diffused by diffuser 232 so that the display pixel grid structure is attenuated and the moiré effect is reduced or completely avoided.

Figure 18:
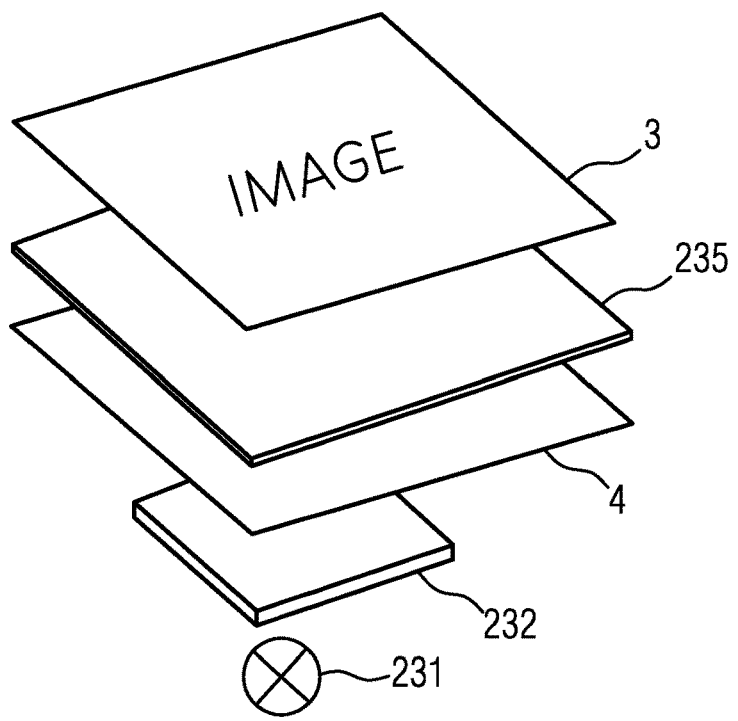

FIG. 18 shows another display according to the invention wherein the moiré effect is prevented even without perfect alignment. Here, an additional diffuser 235 is placed between the contrast enhancer display 4 and the transmissive display 3. The diffuser 232 of FIG. 13 stays, also in this embodiment, close to the light source 231. Usually, the diffuser 232 has an additional role, like also controlling the light cone for the non-lambertian light distribution for the system. This means, to distribute light only in the eyebox 24 and to minimise amount of light that goes to other directions, which would decrease system efficiency. In these situations, the diffuser would have to be placed at a certain distance behind the transmissive display 3. This would move also the contrast enhancer display 4 at an incompatible distance with the one required for the reduction of the parallax effect. For this reason, the preferable embodiment is to have the contrast enhancer display 4 placed between the diffuser 232 and the transmissive display 3, and to have an additional diffusing layer 235 with the purpose of only eliminating the moiré effect. The additional diffuser 235 is placed between the two displays 3, 4, as shown. Of course, if the alignment procedure for transmissive display 3 and contrast enhancer display 4 is sufficiently good, so that the moiré pattern is invisible, the additional diffuser can be discarded entirely.

Figure 19:
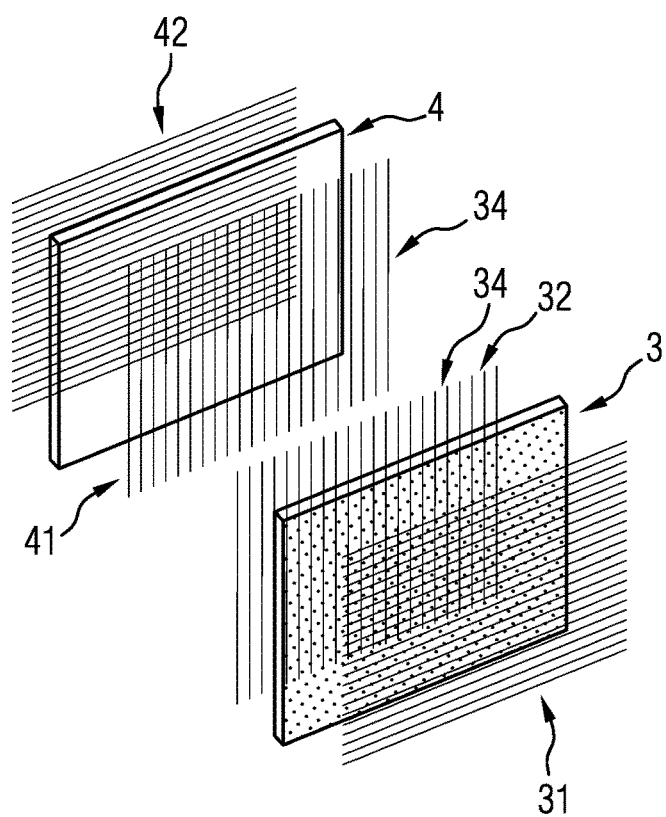

FIG. 19 shows layers of the display according to the invention. The transmissive display 3 is shown in the front and the contrast enhancer display 4 is shown in the background. The front polariser 31 and the back polariser 32 of the transmissive display 3 are shown separated from the display 3. The orientation of the stripes indicates the polarisation direction. The contrast enhancer display 4 also has a front polariser 41 and a back polariser 42. It can be seen at arrow 34 that the orientation of the back polariser 32 of the transmissive display 3 and of the front polariser 41 of the contrast enhancer display 4 are the same thus that the polarisation direction is parallel.

Both, the transmissive display 3, and the contrast enhancer display 4 may use polarised light, for example because they are of the LCD type. In this case, in addition to the alignment needed to minimise the moiré pattern, care is to be taken for the alignment of the polarisation directions as seen in the figure. The front polariser of the contrast enhancer display 4 must be aligned parallel to the back polariser 32 of the transmissive display 3. If the polarisation directions are not correctly aligned, there will be a loss of brightness, as part of the light transmitted by the contrast enhancer display 4 will have an incorrect polarisation to pass also completely through the back polariser 32 of the transmissive display 3. This effect can be minimised if the contrast enhancer display 4 is designed to not produce a very strong polarisation of the passing light. This may affect the display contrast ratio, but as the HUD system's performance is improved even for small contrast ratios for the contrast enhancer display 4, this poses no problem for the final implementation. Moreover, this measure may also increase the transmittance of the contrast enhancer display 4, allowing for a better and smaller power dissipation for the light source 231, as less light is needed to produce the same virtual image brightness.

Figure 20:
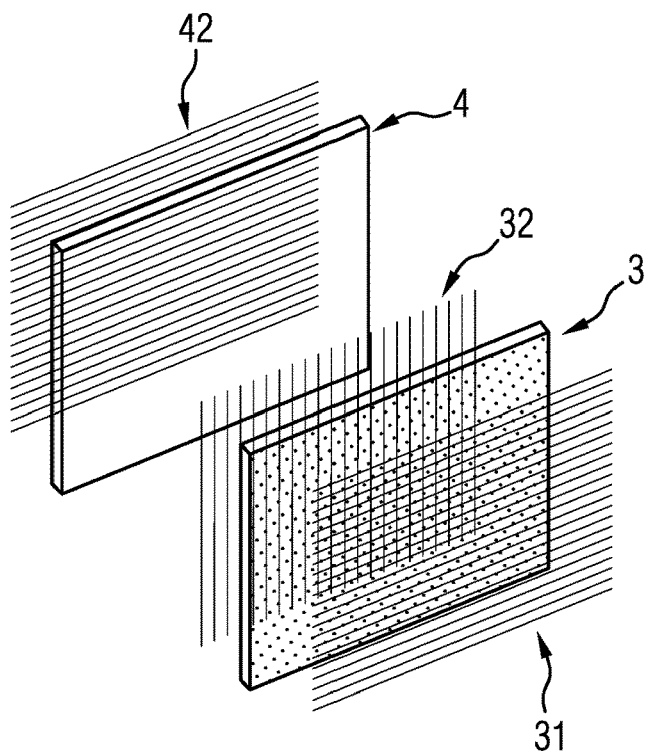

FIG. 20 shows layers of the display according to an embodiment of the invention. The transmissive display 3 and the contrast enhancer display 4 are the same as in the previous figure. The transmissive display 3 is provided with a front polariser 31 and a back polariser 32. The contrast enhancer display 4 is only provided with a back polariser 42.

The back polariser 42 is aligned to the back polariser 32 of the transmissive display 3 such that their polarisation directions are orthogonal. This is a simplification of the setup shown in FIG. 19. As the front polariser 41 performs the same function as the back polariser 32 of the transmissive display 3, one of these polarisers 41, 32 may be removed from the display stack, as shown. This reduces cost, as one of the polarisers having the same orientation and being arranged next to each other is not required and thus omitted. Of course, the back polariser 32 of the transmissive display 3 might be omitted instead of the front polariser 41 of the contrast enhancer display 4. Both, the contrast enhancer display 4 and the transmissive display 3 shown here are either of liquid crystal type or of any other display technology or combination of display technologies that require the utilisation of polarised light. According to this embodiment, one of the polarisers is removed.

For the invention to work correctly, the information that is sent to the contrast enhancer display 4 must be highly correlated with the information that is sent to the transmissive display 3. However, as it will be seen, the generation of the information for the contrast enhancer display 4 is much simpler than the image processing needed for local dimming applications. For segmented type displays for contrast enhancer display 4 and transmissive display 3, there is no need for a particular driving scheme as the same information can be sent directly to both displays 3, 4. This derives from the requirement that the contents of the contrast enhancer display 4 must be correlated with the contents of the transmissive display 3. This translates basically in the same display segment layout for both displays 3, 4. In case the displays 3, 4 are of a dot-matrix type, the driving information for the contrast enhancer display 4 may be derived online, on a pixel by pixel fashion, eliminating the need for a frame buffer that is used for state of the art local dimming applications.

Figure 21:
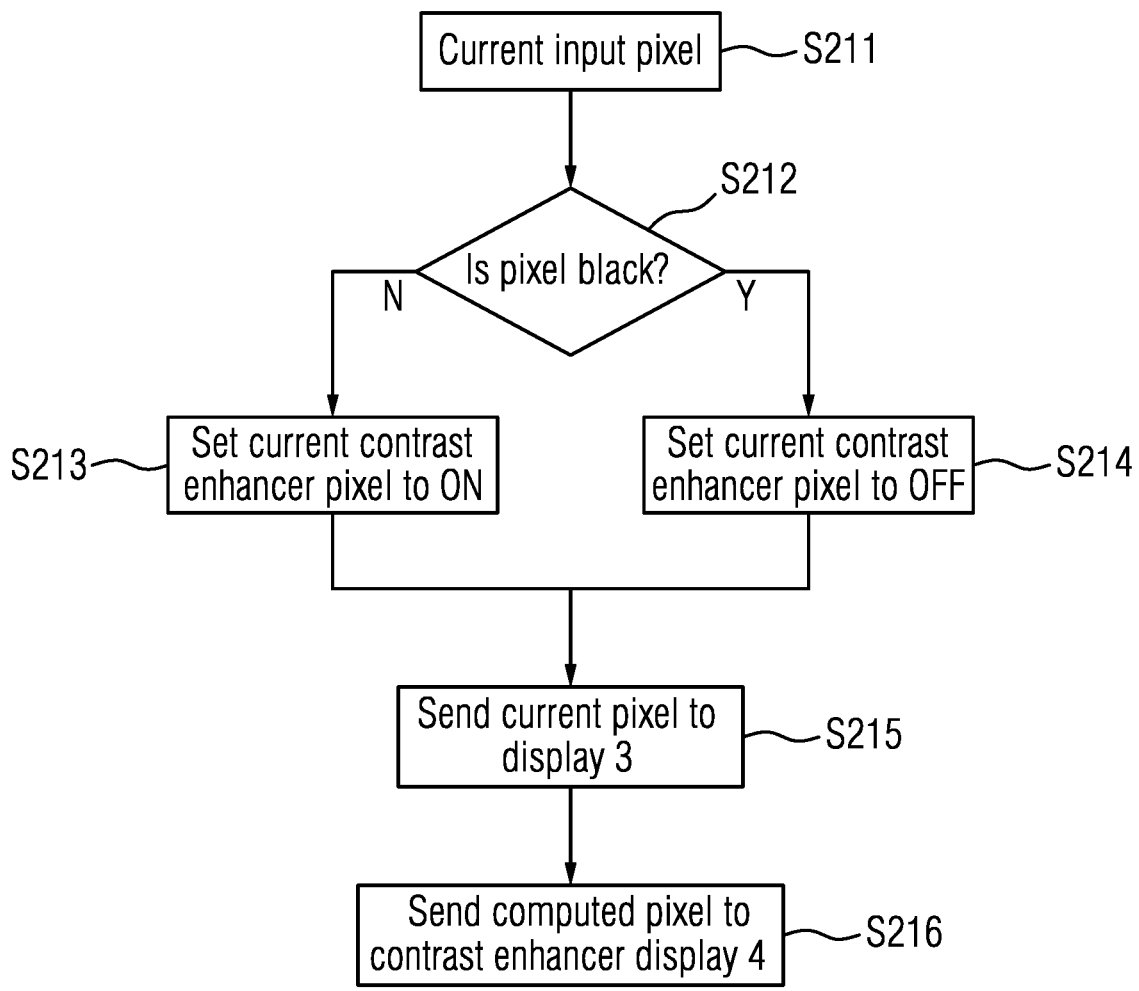

FIG. 21 shows an algorithm according to an embodiment of the invention for driving the contrast enhancer display 4 and the transmissive display 3 in case the contrast enhancer display 4 is a black-and-white display, and both displays 2 and 4 are dot-matrix displays. In step S211 the value of a current pixel to be displayed on the transmissive display 3 is analysed. If the pixel is not black, then step S212 diverts to step S213, else to step S214. Step S213 sets the current contrast enhancer pixel to the ON state. If the pixel is black, step S214 sets the contrast enhancer pixel to the OFF state. Step S215 sends the value of the current pixel to the transmissive display 3. Step S216 sends the pixel value derived in step S213 or S214 to the contrast enhancer display 4.

For a black-and-white contrast enhancer display 4, the processing algorithm needs to determine whether the current pixel for the transmissive display 3 has information in it, which means that it is not black. If the current pixel is black, then the current pixel of the contrast enhancer display 4 is set to the OFF state. Then it blocks the incoming backlight to a level given by transmittance and contrast ratio of the contrast enhancer display 4. If the current pixel to be displayed on the transmissive display 3 is not black, the current contrast enhancer display pixel is set to the ON state, allowing for a large fraction of the backlight to reach the backside of the transmissive display 3.

As presented, the above algorithm uses the same image resolution for both, contrast enhancer display 4 and transmissive display 3. However, the same algorithm can be applied also in case the contrast enhancer display 4 has a different resolution than the transmissive display 3. In this situation, the system performs an image scaling on the transmissive display 3 image to bring it to the resolution of the contrast enhancer display 4. A memory may be needed for scaling the video information from the first resolution to the other resolution. However, the disclosed invention requires a buffer of only several display lines as the image scaling needs information only from the immediate vicinity of the currently processed pixel. Depending on the actual algorithm used for the image scaling, the system designer can trade-off between system performance and system costs. The preferred implementation for the image scaling groups adjacent pixels of the transmissive display 3 image into blocks, and then takes as output value the maximum pixel value from the block. In this way, it is guaranteed that the brightest pixels from the front transmissive display 3 image will have the correct final brightness value. The above scaling method can be applied to all systems employing dot-matrix displays for the contrast enhancer display 4 and the transmissive display 3, independent of the actual display resolutions and/or contrast enhancer 4 subtype construction (black-and-white, greyscale, colour). The basic algorithm used to drive the black-and-white contrast enhancer display 4 is shown in FIG. 21.

If the contrast enhancer display 4 is a greyscale device, the algorithm described in the previous figure must be adjusted in order to generate also the intermediate levels with a black level and a white level. If the transmissive display 3 is a colour display, each pixel is constructed as a set of subpixels of different colour, either spatially or temporarily, for time sequential colour systems. In this case, the algorithm described in FIG. 22 firstly determines which is the brightest of the colour subpixels in step S223, as it has to generate the backlight for this brightest part. With this information, the grey level of the contrast enhancer display 4 is the level that generates no less than the required end-user brightness assuming the transparent display 3 sub-pixels set to the maximum level. That is, the pixel level, as perceived by the end user, will be imposed mainly by the contrast enhancer display 4. The transmissive display 3 will then only refine the final level to the correct one by generating pixel values that will give, in combination with the amount of light transmitted by the contrast enhancer display 4, the light output highly correlated to the initial image. For this, given the brightness level of the contrast enhancer display 4 pixel and the initial pixel values, the system computes the required new pixel values for the transparent display 3 as seen in FIG. 22.

Figure 22:
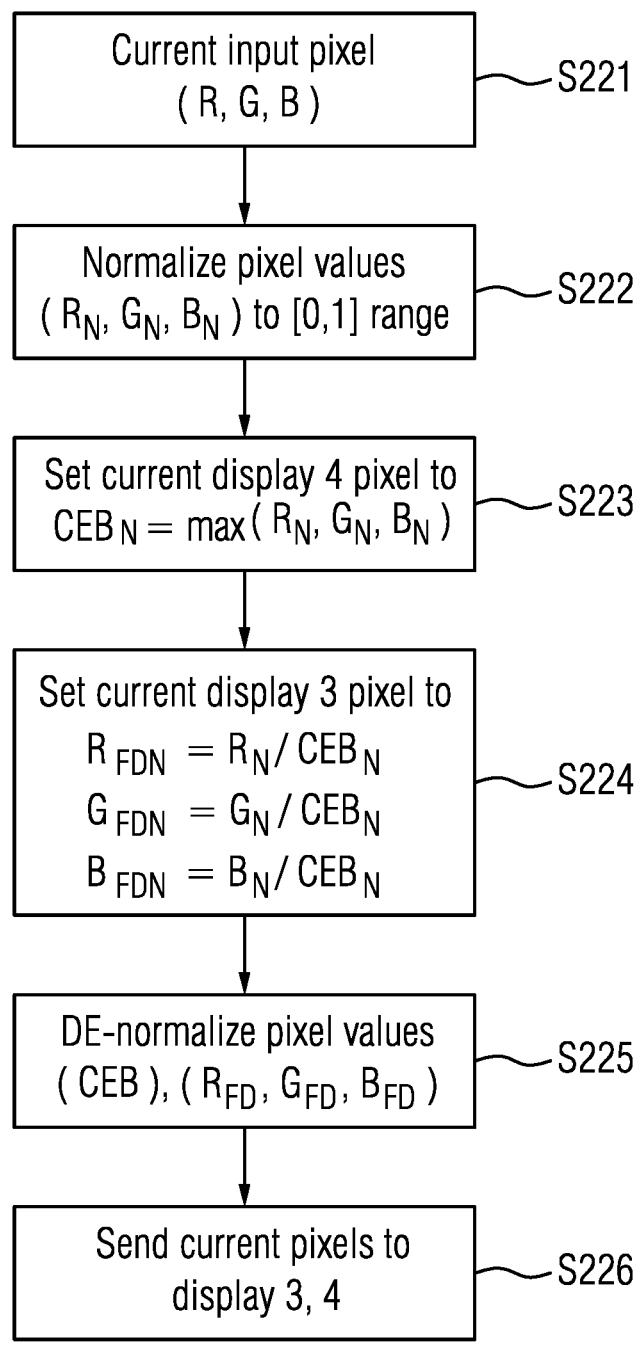

FIG. 22 shows an algorithm according to the invention for a contrast enhancer display 4 being a grayscale display, wherein both, transmissive display 3 and contrast enhancer display 4 are dot-matrix displays. In step S221 the colour values R, G, B of the current pixel are input. Step S222 normalises the pixel values R, G, B to normalized colour pixel values $R_N$, $G_N$, $B_N$ lying in a range between 0 and 1. Step S223 detects the maximum value of the normalised pixel values $R_N$, $G_N$, $B_N$ and sets the value $CEB_N$ of the normalized current pixel of the contrast enhancer display 4 to the maximum value of the normalised pixel values $R_N$, $G_N$, $B_N$. In step S224 values of the current pixel of transmissive display 3 are set to the normalised pixel values $R_N$, $G_N$, $B_N$, each divided by the normalized value $CEB_N$ of the display 4 pixel value determined in step S223. Thus values $R_{FDN}$, $G_{FDN}$, $B_{FDN}$ are reached. Step S225 de-normalises the pixel values determined in steps S223 and S224 to reach values CEB, $R_{FD}$, $G_{FD}$, and $B_{FD}$. Step S226 sends the de-normalized pixel values CEB to the contrast enhancer display 4 and the de-normalized values, $R_{FD}$, $G_{FD}$ and $B_{FD}$ to the transmissive display 3.

It should be clear to everyone skilled in the art that the previously described algorithms are not to be taken literally but only as a guide. In fact, the above diagrams are drawn as presented only for ease of understanding. For instance, the exact position of the normalising step is not critical as long as the values produced after step S225 are compatible with the described algorithm. Practical implementations may choose to collapse steps S222 to S224 or to S225 in a single step that directly performs the detection and the normalisation of the input pixel values.

Although not clearly highlighted in the above description and diagram, care should be taken for the special case where the initial pixel is black. As depicted in the previous figure, the algorithm would yield a division by zero in step S224 however, the problem is easily avoided, as in this case it is readily evident that both contrast enhancer display 4 and transmissive display 3 pixels must be set to the black level. Based on the described algorithms it should be clear to everyone skilled in the art how to derive the needed driving scheme for the special case that also the contrast enhancer display 4 is a colour display. If the transmissive display 3 is a monochrome display, the above algorithm may be simplified as only one colour information per input image pixel has to be processed instead of the individual colour components.

By having the additional contrast enhancer display 4 with relaxed optical requirements placed behind the main transmissive display 3, a very good virtual image for the head-up display system is achieved. It avoids the postcard effect and does not require special, niche market, very high contrast displays, or more immature automotive display technologies for the transmissive display 3, hence the overall system costs are reduced. Since the contrast enhancer display 4 modulates the backlight into areas that are highly correlated to the symbols to be shown by the head-up display system, it is more strongly correlated than for current state of the art solutions like local dimming. It illuminates the needed areas only. Thus, the driver perceives a very good quality image without bright halos around the shown symbols, independent of the ambient illumination conditions. As the head-up display according to the invention does not produce bright halos around the displayed symbols, the equivalent high contrast ratio of the head-up display system is maintained over the entire display area and not only over disjoint areas as for the current state-of-the-art systems. Another advantage comes from the fact that the contrast enhancer display 4 may be placed very close to the transmissive display 3, which minimises the parallax effect. Relative shifts between the modulated backlight and the main image shown on the transmissive display 3 are absent. Even more, since the generation of the driving signals for the contrast enhancer display 4 is much simpler than for state-of-the-art solutions, like local dimming, the image processing and signal processing complexity of the proposed system is only a fraction of that of the state-of-the-art systems. This leads to lower overall system costs as compared to the current state-of-the-art systems.

Figure 23:
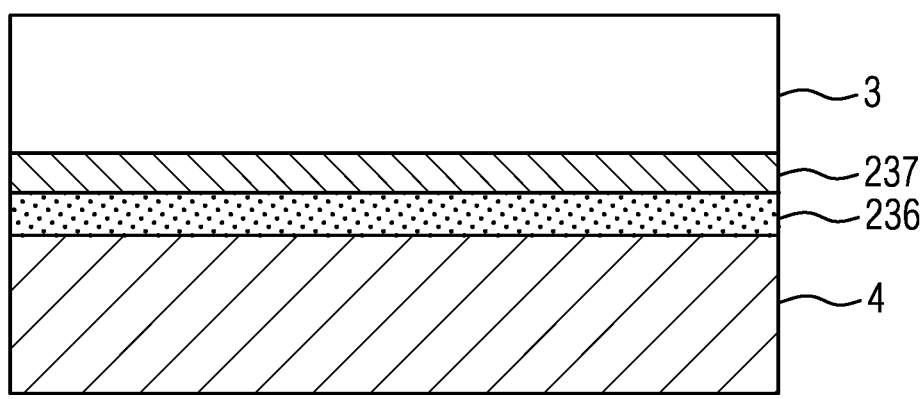

FIG. 23 shows another embodiment of a display according to the invention. The contrast enhancer display 4 is bonded to the backside of the transmissive display 3 with an intermediate diffusor layer 236 and a bonding layer 237. The intermediate diffusor layer 236 reduces the moiré pattern. Additional diffusing layers may be added as appropriate.

Figure 24:
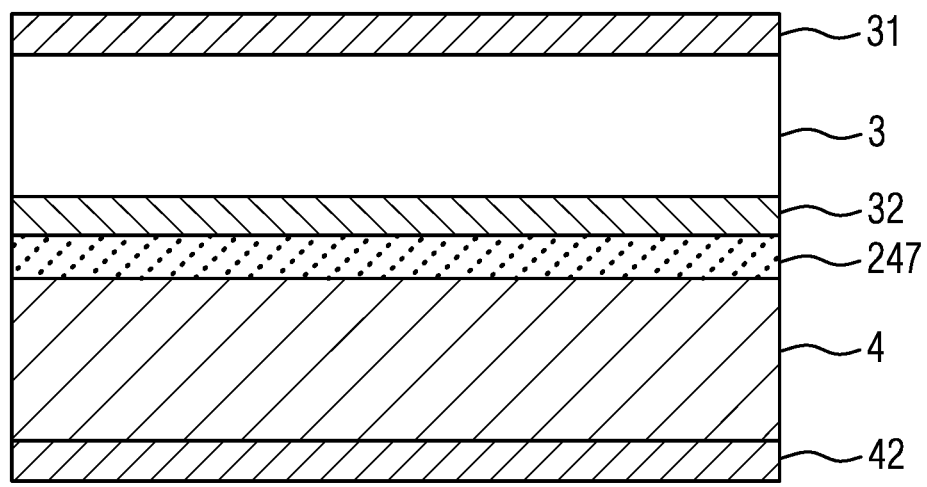

FIG. 24 shows another embodiment of a display according to the invention. The transmissive display 3 is stacked between the front polariser 31 and the back polariser 32. A bonding layer 247 bonds the contrast enhancer display 4 to the stack of front polariser 31, transmissive display 3 and back polariser 32. On the opposite side, the contrast enhancer display 4 is provided with its back polariser 42. Both, contrast enhancer display 4 and transmissive display 3 are of a liquid crystal type or of any other display technology or combination of display technologies that require the utilisation of polarised light. They are bonded together as a single device having three polariser layers only, thus omitting one polariser layer.

The described embodiments may be altered and amended by a skilled person without departing from the invention. Although not described, also derivatives of the described embodiments or combination of different embodiments described above lie within the scope of the invention.

The invention claimed is:

1. A headup display comprising:
    a light source;
    a diffuser;
    a transmissive display;
    a mirror element;
    a transmissive screen;
    a contrast enhancer display arranged adjacent to the transmissive display, wherein both the transmissive display and the contrast enhancer display are types of displays which require polarizers; and
    a polarizer arranged between the contrast enhancer display and the transmissive display.

2. The headup display according to claim 1, wherein the diffuser is arranged between contrast enhancer display and the transmissive display.

3. The headup display according to claim 1, wherein the contrast enhancer display and the transmissive display are bonded to each other.

4. The headup display according to claim 1, wherein the contrast enhancer display is arranged downstream of the transmissive display.

5. The headup display according to claim 4, wherein the contrast enhancer display is arranged of contrast enhancer display pixels and the transmissive display is arranged of transmissive display pixels, wherein a single transmissive display pixel corresponds to several contrast enhancer display pixels.

6. A headup display comprising:
   a light source;
   a diffuser;
   a transmissive display;
   a mirror element; a transmissive screen;
   a contrast enhancer display arranged adjacent to the transmissive display, wherein the contrast enhancer display is arranged downstream of the transmissive display; and
   wherein the contrast enhancer display is arranged of contrast enhancer display pixels and the transmissive display is arranged of transmissive display pixels, wherein a single contrast enhancer display pixel corresponds to several transmissive display pixels.

7. A method for driving a headup display comprising:
   detecting whether the pixel to be displayed is black;
   setting the respective pixel of the contrast enhancer display to an "ON" state if the pixel to be displayed is black, else setting the respective pixel of the contrast enhancer display to an "OFF" state;
   providing the value of the pixel to be displayed to a transmissive display; and
   providing the set value of the respective contrast enhancer display pixel to the contrast enhancer display.

8. The method according to claim 7, wherein the detecting step further includes detecting the maximum value of colour values of the pixel to be displayed and the setting includes setting the respective contrast enhancer display pixel to a brightness that corresponds to the detected maximum value.

9. The method according to claim 8, wherein a normalising is performed before the detecting and a denormalising is performed following the setting.

* * * * *